(12) United States Patent
Turnbow

(10) Patent No.: US 8,789,838 B1
(45) Date of Patent: Jul. 29, 2014

(54) VEHICLE SUSPENSION SYSTEM

(71) Applicant: Carl D Turnbow, Oilton, OK (US)

(72) Inventor: Carl D Turnbow, Oilton, OK (US)

( * ) Notice: Subject to any disclaimer, the term of this patent is extended or adjusted under 35 U.S.C. 154(b) by 0 days.

(21) Appl. No.: 13/915,075

(22) Filed: Jun. 11, 2013

(51) Int. Cl.
*B60G 11/18* (2006.01)

(52) U.S. Cl.
USPC ...... 280/124.166; 280/124.125; 280/124.134; 280/124.164; 280/124.165

(58) Field of Classification Search
USPC ............ 280/124.125, 124.13, 124.134, 280/124.137, 124.164, 124.165, 124.166
See application file for complete search history.

(56) References Cited

U.S. PATENT DOCUMENTS

| | | | |
|---|---|---|---|
| 5,326,128 A * | 7/1994 | Cromley, Jr. | 280/656 |
| 6,299,259 B1 * | 10/2001 | MacKarvich | 301/127 |
| 7,726,674 B2 * | 6/2010 | VanDenberg et al. | 280/124.128 |
| 8,186,697 B2 * | 5/2012 | Stephenson et al. | 280/124.166 |
| 2009/0278329 A1 * | 11/2009 | VanDenberg et al. | 280/124.13 |
| 2010/0201095 A1 * | 8/2010 | Stephenson et al. | 280/124.166 |
| 2012/0211957 A1 * | 8/2012 | Revelino et al. | 280/104 |
| 2012/0326412 A1 * | 12/2012 | VanDenberg et al. | 280/124.125 |
| 2013/0241168 A1 * | 9/2013 | Michel | 280/124.166 |

* cited by examiner

*Primary Examiner* — Toan To
(74) *Attorney, Agent, or Firm* — Edward L. White

(57) ABSTRACT

A suspension system for a vehicle comprising at least one pair of axles with one axle of each pair disposed on each side of the vehicle, each axle having a shaft, an arm connected to the shaft's outer end projecting tangentially to a terminal end and located outside of the vehicle's frame, a spindle affixed to the terminal end of each arm and adapted to engage a wheel; a rotational attachment means for affixing each axle to the underside and for allowing it to rotate, at least one axle retainer adapted to prevent lateral movement of each axle; a torsion means for resisting rotation of each axle in response to a load supported by each axle; and at least one limiter to limit rotation of each axle relative to the frame, whereby, application of a load biases the axle against the torsion means supporting the frame and absorbing shocks.

24 Claims, 5 Drawing Sheets

VEHICLE SUSPENSION SYSTEM

CROSS-REFERENCE TO RELATED APPLICATIONS

None.

FIELD OF THE INVENTION

The invention relates to suspension systems for vehicles. More particularly, the invention relates to suspension systems for supporting a load and for providing absorption and damping of shocks to the vehicle caused by its motion over uneven surfaces.

SUMMARY OF THE INVENTION

In general, prior art vehicle suspension systems failed to provide many advantages and features of the present invention. Prior art suspension systems using torsion axles were well known. Prior art torsion axles generally used either a bar deflected by a load on the vehicle or a plurality of resilient members captured in a mechanism and adapted to resist rotation of the axle under load.

Older torsion axles often used at least one elongated torsion rod that was twisted by forces applied through the axle. U.S. Pat. No. 5,326,128 to Cromley, Jr. teaches such a torsion rod configuration. These elongated rods were subject to failure due to the extreme forces applied at key stress points within the torsion rods.

U.S. Pat. No. 6,299,259 to MacKarvich for a removable spindle axle for torsion axle assembly, involved a square bar inside of a larger square tubing with rubber cords disposed between the inner bar and the outer tubing and adapted to resist torsional forces on the inner bar. MacKarvich provided limited angular displacement of the support arm to where the tire is attached.

U.S. Pat. No. 8,245,353 to Homner et al. for a hinge with tension-adjustable spiral torsion spring is in a related but different field. The resistance to torsion in Homner is provided by a spring rather than by rubber cords. Homner's spring is disposed within a cylinder which constrains its axial movement. However, there are no mechanical limits to the number of times the spring can be rotated nor to the torque forces to which it can be exposed. Continued operation of the gear mechanism to increase torque on the spring in Homner could cause it to fail due to increased torque being applied.

The present invention overcomes these shortcomings in the prior art by providing a durable, reliable, and simple axle providing support for a vehicle carrying a wide range of weight loads, to wit: a suspension system for a vehicle having a frame with a top and an underside, and two sides. The vehicle on which the invention is used may often be a trailer towed behind another vehicle, but there is no reason that the suspension system taught by the present invention cannot be used in any type of vehicle.

The suspension system comprises at least one pair of axles affixed to the vehicle. It is expected that each axle will have a pair of wheels disposed on each side of the vehicle. Each axle may have a shaft with a first portion having an inner end and an outer end, an arm connected to the outer end and projecting tangentially therefrom to a terminal end, the arm located outside of the vehicle frame, and a spindle affixed to the terminal end of each arm and adapted to engage a wheel. These components (the first portion, the arm, and spindle) may be a single integral component or they may be different parts mechanically joined in operation. A rotational attachment means for affixing each axle to the underside and for allowing it to rotate relative thereto is provided, which includes at least one axle retainer adapted to prevent lateral movement of each axle. A torsion means for resisting rotation of each axle in response to a load supported by each axle having at least one limiter to limit rotation of each axle relative to the frame is provided. Using these components, application of a load biases the axle against the torsion means which supports the frame and absorbs shocks created by motion of the vehicle over uneven surfaces.

In a pair of axles on opposing sides of a vehicle, one of the axles may be relatively closer to a front of the frame compared to its companion axle, whereby, when the vehicle passes over a linear defect in a surface transverse to a direction of travel by the vehicle, the resulting shock is broken into two smaller shocks rather than one relatively larger shock.

The affixation means for attaching an axle to the frame may comprise a split block defining a channel therein adapted to releasably and rotationally engage, secure, and align the axle in longitudinal, lateral, and vertical axes, the block being releasably affixed to the frame. The affixation means may also include at least one fastener adapted to align and secure a torsion means and the apparatus to the frame. A loading means for selecting a desired torsion setting may be provided which allows adjustment of the torsional force provided by the torsion means. Adjustment of the torsion means may be accomplished by electromechanical or electrohydraulic or electropneumatic device for selecting a desired torsion setting. See, for example, U.S. Pat. No. 8,245,353, incorporated herein by reference.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers, and practitioners in the art who are not familiar with patent or legal terms or phraseology, to determine quickly from a cursory inspection the nature and essence of the technical disclosure of the application. The abstract is neither intended to define the

DETAILED DESCRIPTION OF THE INVENTION

Figure 1:
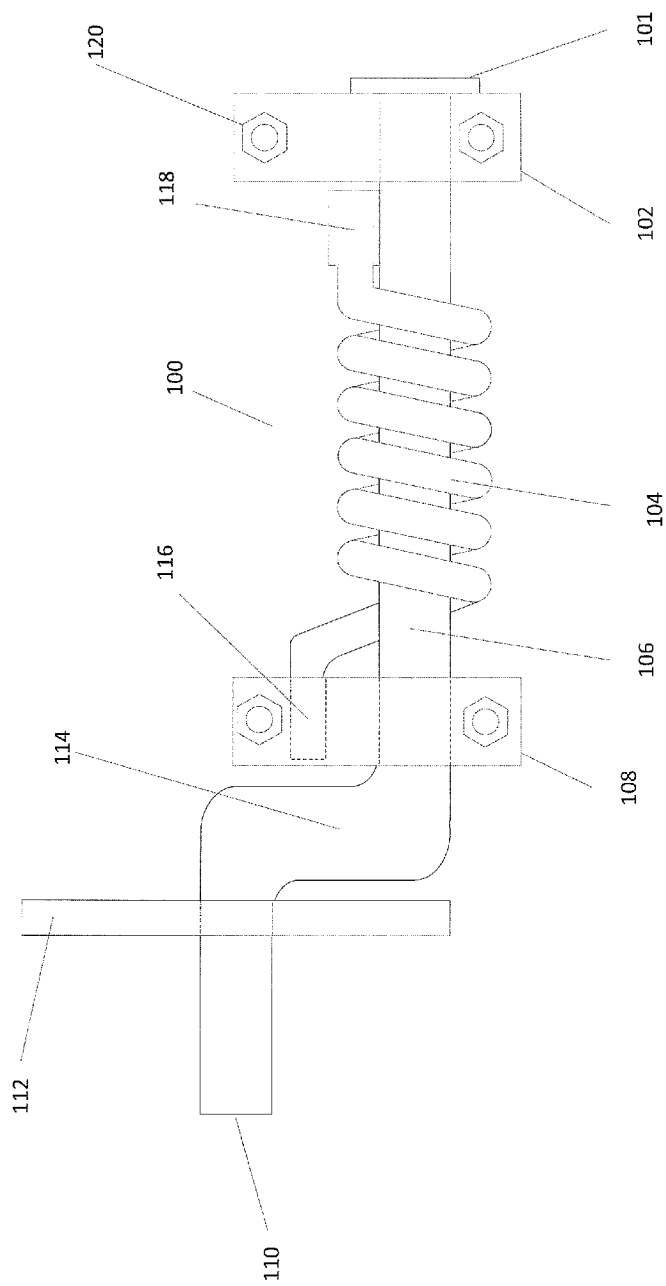
FIG. 1 is a bottom view of the suspension system.

FIG. 1 illustrates the apparatus 100 generally from a bottom view. The shaft 106 can been seen surrounded by a spring 104. The spring 104, as shown, provides the torsion resistance to loads applied to the axle. The spring 104 is anchored at one end in a bushing block spring retainer at 116 and at the other end in an axle spring retainer 118. The outer lower bushing block 108 may include an integrated travel limiter, and that feature will be more fully discussed and shown in subsequent figures.

The outer lower bushing block 108 has a companion in the inner lower bushing block 102; between these two parts, the shaft 106 is retained in a rotatable fashion. The inner lower bushing block 102 is shown in retaining engagement with the axle retainer 101. The axle retainer 101 may either be threadedly engaged, formed into or otherwise affixed to a terminal end of the shaft 106, and it has a larger diameter than the shaft 106. A face of the retainer 101 engages the inner bushing block 102, thus preventing outward lateral movement of the shaft 106.

The shaft 106 is shown continuously joined with a connecting arm 114 which is perpendicular to a main axis of the shaft 106. Further, the connecting arm 114 is continuously affixed to a spindle 110 which is substantially parallel to the main axle of the shaft 106 and perpendicular to the connecting arm 114. It is anticipated that these three components—the shaft 106, the connecting arm 114, and the spindle 110—will be continuously formed. However, they could be one or more discreet pieces in a particular embodiment of the present invention.

The brake drum 112 may be affixed to the spindle 110 in any of a well-known number of ways. Those affixation methods for a brake drum are incorporated herein by reference. A wheel would then be affixed to another series of mechanical components which engaging the spindle 110. Alternatively, the spindle 110 may be affixed to the connecting arm 114 by passing therethrough in a fashion as shown in U.S. Pat. No. 6,299,259 to MacKarvich, incorporated herein by reference.

Figure 2:
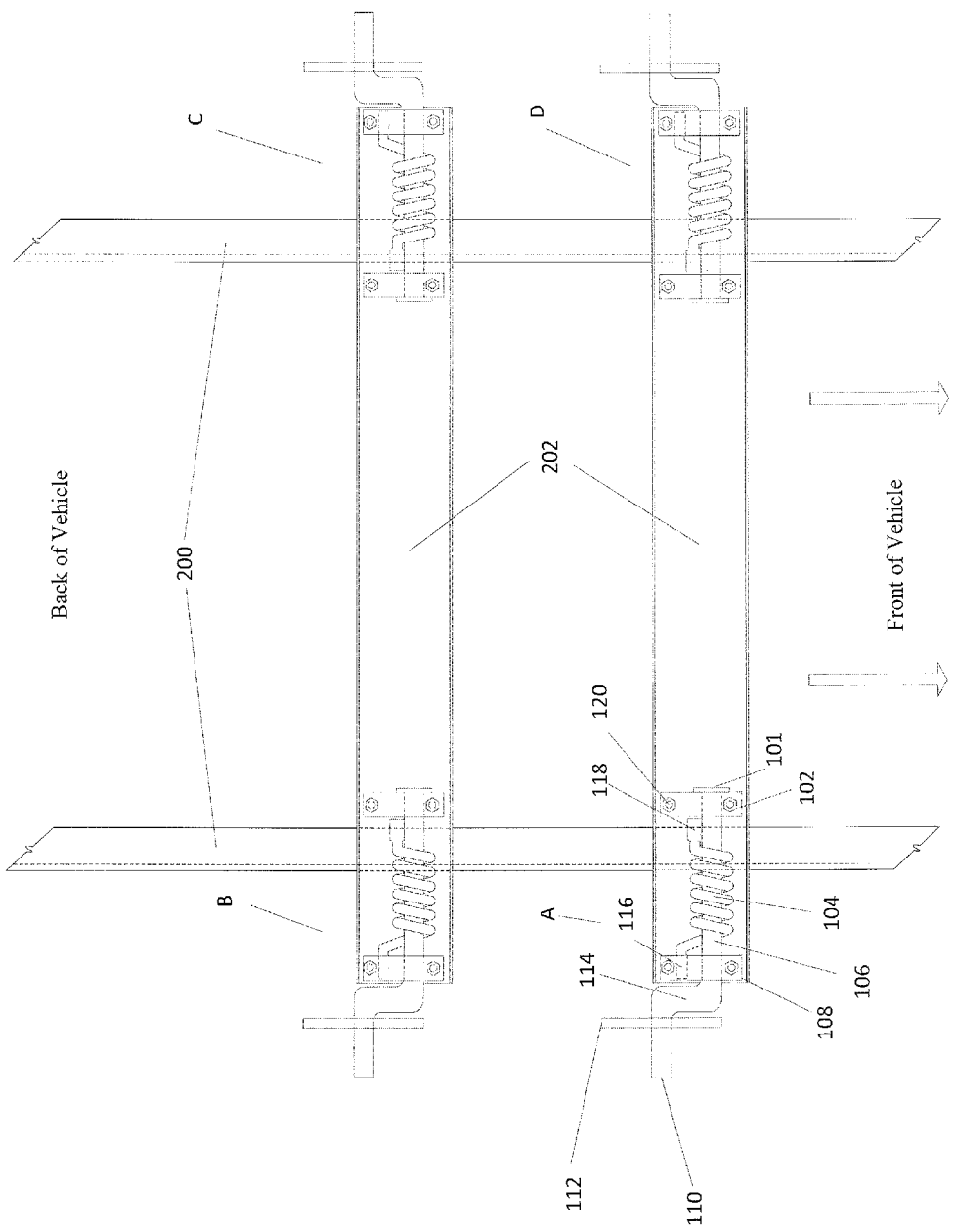
FIG. 2 is a bottom view of suspension system attached to the vehicle frame.

FIG. 2 shows a plan view of an embodiment of the present invention with four axles engaging a frame of a vehicle according to the present invention. Each of the four axles, A-D, are substantially identical in their construction, so the components of only one of the axles, axle A, are numbered and described specifically herein. A pair of C-channel frames 200 runs perpendicular to each of the shafts 106. Each axle is shown mounted to a C-channel axle support 202 parallel to the shafts 106. The two bushing blocks 102 and 108 are held onto the C-channel axle supports 202 by bolts 120. In the embodiment shown in FIG. 2, each of the axles is aligned with its companion axle mounted to the same C-channel axle support 202. Axle A is aligned with corresponding axle D, and axle B is aligned with its corresponding axle C FIG. 2 illustrates the preferred position of the connecting arm 114 relative to the vehicle frame in which the connecting arm 114 in a rest position, when the vehicle is unloaded, is substantially parallel to the ground. The connecting arm 114 is directed toward the back of the vehicle behind the shaft 106. Thus, when the vehicle is loaded, the connecting arm 114 is rotatingly biased up and toward the front of the vehicle by additional weight placed on the vehicle.

Figure 3:
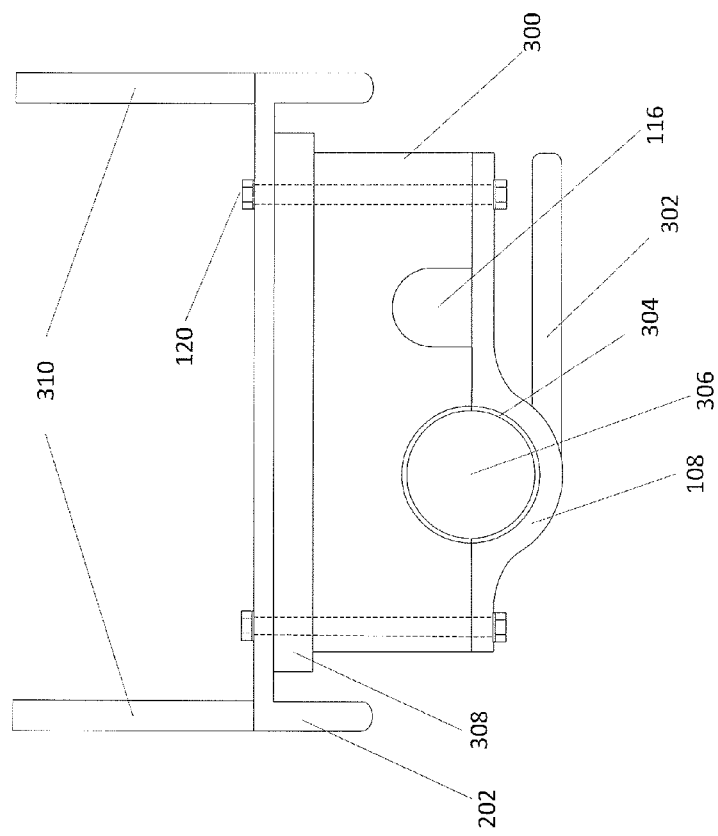
FIG. 3 is a side view of the suspension system.

FIG. 3 illustrates the outer bushing block 108 and its related constituent parts. The C-channel axle support 202 is abutted by a pair of braces 310 to provide additional support and bracing to the C-channel axle support 202. Bolts 120 pass through the outer lower bushing block 108, then through the outer upper bushing block 300, and then through a rigid member 308 to affix those components to the C-channel axle support 202. The outer lower bushing block 108 and the outer upper bushing block 300 define an axle channel 306 adapted to receive the shaft 106. Similarly, the outer lower bushing block 108 and the upper bushing block 300 define the bushing block spring retainer 116, previously discussed in FIG. 1, which can be seen more clearly in FIG. 3. A travel limiter 302 is shown integrally formed onto the outer lower bushing block 108. An axle bushing 304 is shown as a liner within the axle channel 306. The axle bushing 304 may be a polymeric material, and Bakelite® has been used successfully. It is also anticipated that it is possible that some sort of a metallic liner material may be appropriate for use as a bearing surface in this instance. The art of allowing for movement under pressure of two surfaces in close proximity is well known, and the techniques and materials known to those skilled in the art of allowing close proximity materials under pressure to move are incorporated into this disclosure by reference.

The optional rigid member 308 shown disposed between the outer upper bushing block 300 and the C-channel axle support 202 stiffens the construction given the great stresses applied by the operation of the apparatus under load. Similarly, the bracing 310 shown above the C-channel axle support 202 also provides rigidity to the frame. It is anticipated that in some instances it may be desirable to have the rigid member 308 and the bracing 310 incorporated into a single member, which essentially becomes another C-channel support member with its opening facing away from the opening of the C-channel axle support 202.

Figure 4:
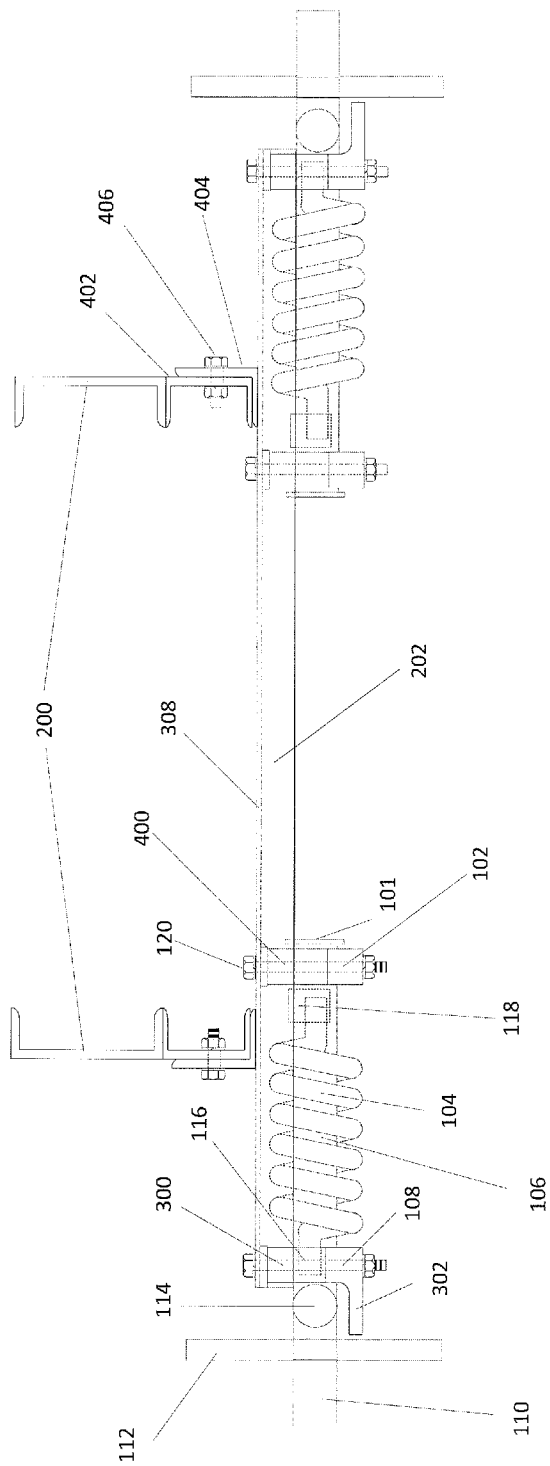
FIG. 4 is a front view of the suspension systems attached to the vehicle frame.

FIG. 4 illustrates a C-channel axle support 202 extending from a first axle at a left side of the figure to a second axle at the right side. Since the axles are mirror images of one another, the components of the axle are illustrated with reference to the left axle only. A bolt 120 holds the inner lower bushing block 102, the inner upper bushing block 400, and the optional rigid member (shown with dashed line) 308 to the C-channel axle support 202. In similar fashion, the outer lower bushing block 108 with integrated travel limiter 302 is held against the C-channel axle support 202, with the outer upper bushing block 300 and the optional rigid member 308 sandwiched therebetween by another bolt. The spring 104 is held between the outer lower bushing block 108 and the outer upper bushing block 300 in the bushing block spring retainer 116. At its other end, the spring 104 is affixed within the axle spring retainer 118, which is integrated with or attached to the axle 106.

The travel limiter 302 can be seen disposed below the connecting arm 114. Loads applied to the vehicle bend to bias the connecting arm 114 upwardly and away from the travel limiter 302, but under certain conditions, it is possible that the connecting arm 114, in an unloaded dynamic condition (for example, when the vehicle hits a large bump and projects upwardly, then free-falls down) could attempt to pass beyond the desired operating position. The travel limiter 302 prevents this from happening.

Connection of the C-channel axle support 202 to the C-channel frame 200, running perpendicular thereto is accomplished by the use of a connection C-channel 402 disposed below the C-channel frame 202. The connection C-channel 402 rests on and against an L-bracket 404 affixed to the C-channel axle support 202. The connection C-channel 402 and the L-bracket 404 are affixed together by at least one frame bolt 406.

Figure 5:
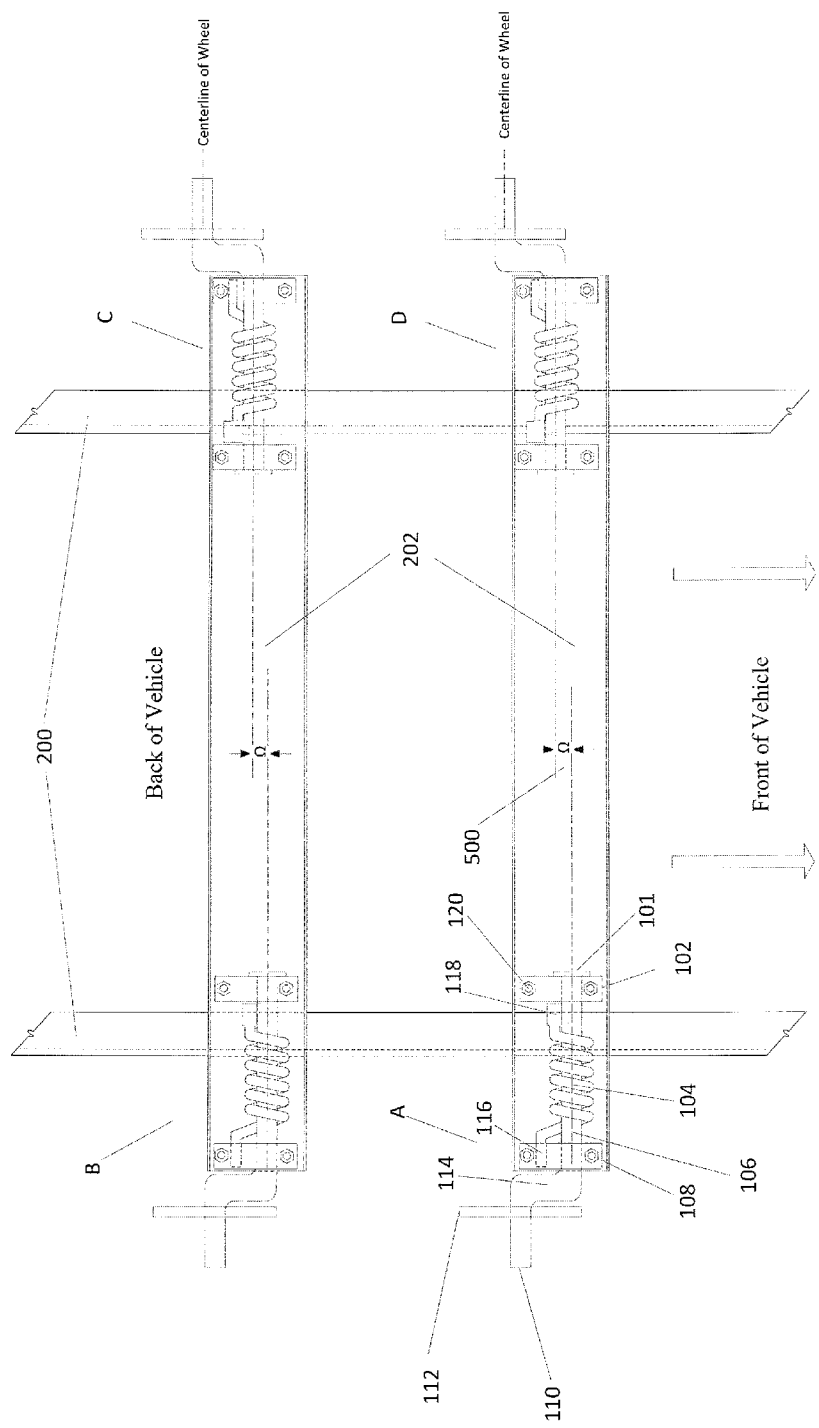
FIG. 5 is a bottom view of the suspension system attached to a vehicle frame with the axles on one side offset from the other side.

FIG. 5 shows a plan view, similar to FIG. 2, of an embodiment of the present invention with four axles engaging a frame of a vehicle according to the present invention. Each of the four axles, A-D, are substantially identical in their construction, so the components of only one of the axles, axle A, are numbered and described specifically herein. A pair of C-channel frames 200 runs perpendicular to each of the shafts 106. Each axle is shown mounted to a C-channel axle support 202 parallel to the shafts 106. In the embodiment shown in FIG. 5, each of the axles is offset from its companion axle mounted to the same C-channel axle support 202. Axle A is offset from its corresponding axle D by distance (Ω) 500, and axle B is similarly offset from its corresponding axle C. The offset is intended to disperse the resulting shock when the wheels pass over a bump because the axle disposed ahead of its companion axle will encounter perpendicular obstacles before its companion, and two separate shocks will result, neither of which has an amplitude as large as the shock that would result from both of them striking the perpendicular obstacle at the same time.

The purpose of the abstract is to enable the U.S. Patent and Trademark Office and the public generally, and especially the scientist, engineers, and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiments or modifications therein shown, illustrated, described, or disclosed. Such other embodiments or modifications are intended to be reserved especially as they fall within the scope of the claims herein appended.

Having thus described the invention, I claim:

1. A suspension system for vehicle having a frame with a top and an underside, and two sides, the suspension system comprising
    a. at least one pair of axles with one axle of each pair disposed on each side of the vehicle, each axle having—
        i. a shaft with a first portion having an inner end and an outer end,
        ii. an arm connected to the outer end and projecting tangentially therefrom to a terminal end, the arm located outside of the vehicle frame, and
        iii. a spindle affixed to the terminal end of each arm and adapted to engage a wheel;
    b. a rotational attachment means for affixing each axle to the underside and for allowing it to rotate relative thereto,
    c. at least one axle retainer adapted to prevent lateral movement of each axle;
    d. a torsion means for resisting rotation of each axle in response to a load supported by each axle; and
    e. at least one limiter to limit rotation of each axle relative to the frame,
whereby, application of a load biases the axle against the torsion means which supports the frame and absorbs shocks created by motion of the vehicle over uneven surfaces.

2. The system of claim 1 where two axles are affixed to the frame on opposite sides thereof.

3. The system of claim 2 where one of the axles is relatively closer to a front of the frame compared to its companion axle, whereby, when the vehicle passes over a linear defect in a surface transverse to a direction of travel by the vehicle, the resulting shock is broken into two smaller shocks rather than one relatively larger shock.

4. The system of claim 1 where two axles are affixed to each side of the frame.

5. The apparatus of claim 4 where each axle on one side is relatively closer to a front of the frame compared to its companion axle on an opposing side, whereby, when the vehicle passes over a linear defect in a surface transverse to a direction of travel by the vehicle, the resulting shock is broken into two smaller shocks rather than one relatively larger shock.

6. The system of claim 1 where three axles are affixed to each side of the frame.

7. The apparatus of claim 6 where each axle on one side is relatively closer to a front of the frame compared to its companion axle on an opposing side, whereby, when the vehicle passes over a linear defect in a surface transverse to a direction of travel by the vehicle, the resulting shock is broken into two smaller shocks rather than one relatively larger shock.

8. The apparatus of claim 1 where the affixation means comprises a split block defining a channel therein adapted to releasably and rotationally engage, secure, and align the axle in longitudinal, lateral, and vertical axes, the block being releasably affixed to the frame.

9. The apparatus of claim 8 where the affixation means further includes at least one fastener adapted to align and secure a torsion means and the apparatus to the frame.

10. The apparatus of claim 1 further including a loading means for selecting a desired torsion setting.

11. The apparatus of claim 10 where the loading means further includes at least one electromechanical or electrohydraulic or electropneumatic device for selecting a desired torsion setting.

12. The apparatus of claim 1 where the torsion means comprises at least one torsion element adapted to resist the rotation of the axle selected from a group of spring, air spring, elastomeric member, and torsion rod.

13. A suspension system for vehicle having a frame with a top and an underside, and two sides, the suspension system comprising
    a. at least one pair of axles with one axle of each pair disposed on each side of the vehicle, each axle having—
        i. a shaft with a first portion having an inner end and an outer end,
        ii. an arm connected to the outer end and projecting tangentially therefrom to a terminal end, the arm located outside of the vehicle frame, and
        iii. a spindle affixed to the terminal end of each arm and adapted to engage a wheel;
    b. a rotational attachment means for affixing each axle to the underside and for allowing it to rotate relative thereto,
    c. at least one axle retainer adapted to prevent lateral movement of each axle;

d. a spring for resisting rotation of each axle in response to a load supported by each axle; and e. at least on limiter to limit rotation of each axle relative to the frame, whereby, application of a load biases the axle against the spring which supports the frame and absorbs shocks created by motion of the vehicle over uneven surfaces.

14. The system of claim 13 where two axles are affixed to the frame on opposite sides thereof.

15. The system of claim 14 where one of the axles is relatively closer to a front of the frame compared to its companion axle on an opposing side, whereby, when the vehicle passes over a linear defect in a surface transverse to a direction of travel by the vehicle, the resulting shock is broken into two smaller shocks rather than one relatively larger shock.

16. The system of claim 13 where two axles are affixed to each side of the frame.

17. The apparatus of claim 16 where each axle one side is relatively closer to a front of the frame compared to its companion axle on an opposing side, whereby, when the vehicle passes over a linear defect in a surface transverse to a direction of travel by the vehicle, the resulting shock is broken into two smaller shocks rather than one relatively larger shock.

18. The system of claim 13 where three axles are affixed to each side of the frame.

19. The apparatus of claim 18 where each axle one side is relatively closer to a front of the frame compared to its companion axle on an opposing side, whereby, when the vehicle passes over a linear defect in a surface transverse to a direction of travel by the vehicle, the resulting shock is broken into two smaller shocks rather than one relatively larger shock.

20. The apparatus of claim 13 where the affixation means comprises a split block defining a channel therein adapted to releasably and rotationally engage, secure, and align the axle in longitudinal, lateral, and vertical axes, the block being releasably affixed to the frame.

21. The apparatus of claim 20 where the affixation means further includes at least one fastener adapted to align and secure the spring and the apparatus to the frame.

22. The apparatus of claim 13 further including a loading means for selecting a desired torsion setting.

23. The apparatus of claim 22 where the loading means further includes at least one electromechanical or electrohydraulic device for selecting a desired torsion setting.

24. A suspension system for vehicle having a frame with a top and an underside, and two sides, the suspension system comprising a. at least one pair of axles with one axle of each pair disposed on each side of the vehicle, each axle having—
   i. a shaft with a first portion having an inner end and an outer end,
   ii. an arm connected to the outer end and projecting tangentially therefrom to a terminal end, the arm located outside of the vehicle frame, and
   iii. a spindle affixed to the terminal end of each arm and adapted to engage a wheel;

b. a rotational attachment means for affixing each axle to the underside and for allowing it to rotate relative thereto, one of the axles of each pair being relatively closer to a front of the frame compared to its companion axle, whereby, when the vehicle passes over a linear defect in a surface transverse to a direction of travel by the vehicle, the resulting shock is broken into two smaller shocks rather than one relatively larger shock;

c. at least one axle retainer adapted to prevent lateral movement of each axle;

d. a spring for resisting rotation of each axle in response to a load supported by each axle; and e. at least on limiter to limit rotation of each axle relative to the frame, whereby, application of a load biases the axle against the spring which supports the frame and absorbs shocks created by motion of the vehicle over uneven surfaces.

* * * * *